S. W. RICE.
Animal Cage-Traps.

No. 137,864.  Patented April 15, 1873.

Witnesses.  Inventor.

UNITED STATES PATENT OFFICE.

SYLVESTER W. RICE, OF ROSEBURG, OREGON.

IMPROVEMENT IN ANIMAL CAGE-TRAPS.

Specification forming part of Letters Patent No. 137,864, dated April 15, 1873; application filed February 1, 1873.

*To all whom it may concern:*

Figure 1:
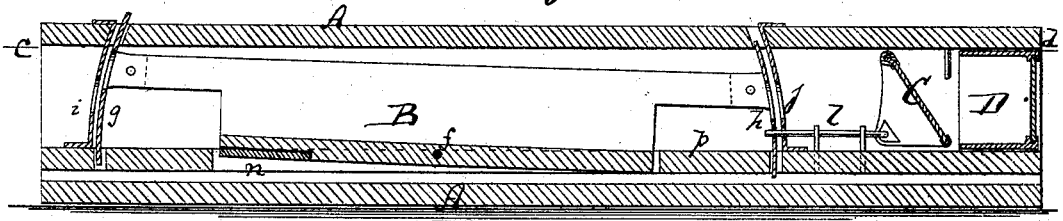
Figure 2:
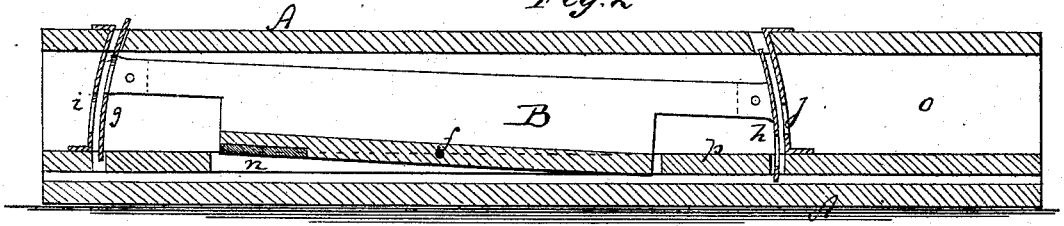
Figure 3:
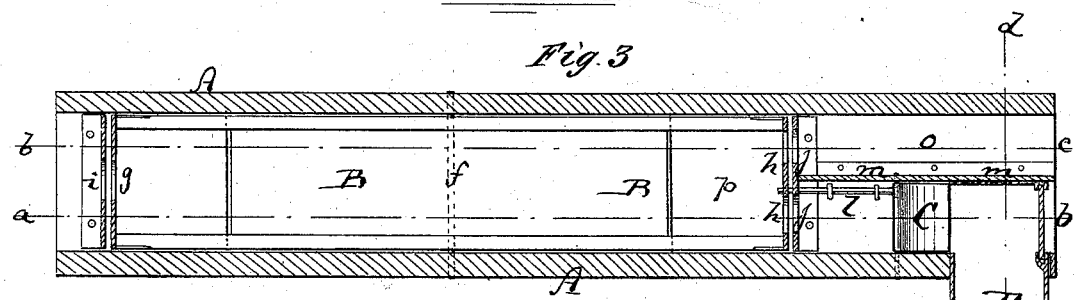
Figure 4:
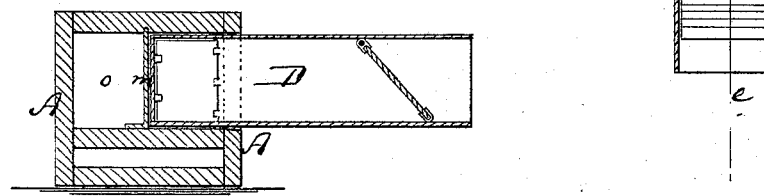

Be it known that I, SYLVESTER W. RICE, of Roseburg, in the county of Douglas and State of Oregon, have invented a new and Improved Animal-Trap, of which the following is a specification:

Figures 1 and 2 are vertical longitudinal sections of my improved animal-trap, the lines $a\,b$ and $b\,c$ in Fig. 3, respectively, indicating the planes of section. Fig. 3 is a horizontal section of the same taken on the line $c\,d$, Fig. 1; and Fig. 4 is a vertical transverse section of the same taken on the line $d\,e$, Fig. 3.

Similar letters of reference indicate corresponding parts.

This invention relates to a new self-setting animal-trap; and has for its object to effect the continuous operation of the trap, and to cause each animal, as it is entrapped, to reset the trap for its successor. The invention consists in providing the trap with a treadle having perforated end plates or gates, which, according to the manner in which the treadle is inclined, close or open the trap at the ends.

A in the drawing represents a box or case, of prismatic or other form, placed in a horizontal position. B is a treadle pivoted therein at $f$, and provided at its ends with plates $g$ and $h$, respectively, which extend transversely across the box A, as shown in Fig. 3. Opposite these plates $g$ and $h$ are in the box secured immovable plates $i$ and $j$, respectively. Beyond and near to the plate $j$ is pivoted in the box a frame, C, containing a piece of glass or other transparent substance, and so arranged that its own weight will cause it to assume the inclined position in which it is shown in Fig. 1. The plate C is connected with a bolt, $l$, which can pass through apertures in the plates $h$ and $j$ to lock the same together. Beyond the plate C the box A connects with a chamber, D, or final receptacle for the animals caught. The plate C need not necessarily extend entirely across the box, but may extend about half-way across the same, as indicated in Fig. 3. A plate, $m$, would, in such case, divide that end of the box in which the plate C is arranged, and leave an entrance or channel, $o$, for the animals.

In its normal position that end of the treadle to which the plate $g$ is attached is down, because at $n$ the treadle is weighted to hold the plate $g$ in the lower position. When the plate $g$ is thus swung down an opening through it will be in line with an opening in $i$, and, at the same time, an opening in the plate $h$ will be in line with another opening in the plate $j$ and with the entrance-channel $o$. The trap will thus be approachable from both ends and entirely open. If an animal enters the trap through either end and steps along the treadle toward the plate $p$ in the box, upon which the bait is disposed, it will finally reach the most elevated end of the treadle and cause the same to tip into the position in which it is shown in Figs. 1 and 2. When the treadle is thus tipped, the openings in the plates $g$ and $h$, through which the animals entered or could have entered, are drawn out of line with the entrance-openings in $i$ and $j$ to make escape impossible. At the same time the bolt $l$ is, by the weight of the plate C, forced or pushed through the small apertures in the plates $h$ and $j$ to lock the treadle in this position, and another opening in the plate $h$ is brought in line with another opening in the plate $j$, as in Fig. 1. These last-named two openings are not the same as those formerly mentioned as being in line with the entrance $o$, but are in line with the plate C, as shown in Fig. 3. To the entrapped animal this will appear as the only means of escape from the trap, and, passing through them, it will arrive under the plate C and raise the same to enter the box D, and in raising the plate C the animal causes the bolt $a$ to be withdrawn from the plate $h$, and will thus release the treadle, which will again drop into its former position, reset for further operation, in the manner described.

Having thus described my invention, I claim as new and desire to secure by Letters Patent—

The trap composed of the treadle B, which carries the perforated plates $g$ and $h$, and which is arranged within a box, A, having the plates $i\,j$, to operate substantially as described.

SYLVESTER W. RICE.

Witnesses:
E. M. MOORE,
ANDREW JONES.